United States Patent [19]

Furukawa et al.

[11] Patent Number: 5,987,069
[45] Date of Patent: Nov. 16, 1999

[54] METHOD AND APPARATUS FOR VARIABLY ALLOCATING UPSTREAM AND DOWNSTREAM COMMUNICATION SPECTRA

[75] Inventors: Neil E. Furukawa, Fremont; Sheldon N. Salinger, Los Altos, both of Calif.

[73] Assignee: GTE Government Systems Corporation, Mt. View, Calif.

[21] Appl. No.: 08/774,142

[22] Filed: Dec. 24, 1996

[51] Int. Cl.⁶ .................................................. H04B 15/00
[52] U.S. Cl. .......................... 375/285; 375/261; 370/281; 370/468
[58] Field of Search .................................... 375/227, 259, 375/285, 295, 296, 346, 261, 298, 320, 326, 344; 455/63, 67.3, 226.3, 296, 265; 370/281, 295, 468

[56] References Cited

U.S. PATENT DOCUMENTS

| 3,940,694 | 2/1976 | Price et al. .................................. 325/42 |
| 4,291,277 | 9/1981 | Davis et al. .............................. 330/149 |
| 4,462,001 | 7/1984 | Girard ...................................... 330/149 |

(List continued on next page.)

OTHER PUBLICATIONS

Suzuki, T., Takatori, H., Ogawa, M. and Tomooka, K., "Line Equalizer for a Digital Subscriber Loop Employing Switched Capacitor Technology," IEEE Trans. on Communications, vol. COM–30, No. 9, pp. 2074–2082, Sep. 1982.

Agazzi, O., Tzeng, C.-P.J., Messerschmitt, D.G., and Hodges, D.A., "Timing Recovery in Digital Subscriber Loops," IEEE Trans. on Communications, vol. COM–33, No. 6, pp. 558–569, Jun. 1985.

Gardner, F.M., "A BPSK/ZPSK Timing—Error Detector for Sampled Receivers," IEEE Trans. on Communications, vol. COM–34, No. 5, pp. 423–9, May 1986.

Meyers, M.H., "Robust Control of Decision Directed Loops," IEEE CH2655–9/89/0000–1030, pp. 1030–1036, Sep. 1989.

Sari, Hikmet, and Said, Moridi, "New Phase and Frequency Detectors for Carrier Recovery in PSK and QAM Systems", IEEE Trans. on Communications, vol. 36, No. 9, pp. 1035–1043, Sep. 1988.

Sari, H., Desperben, L., and Moridi, S., "A New Class of Frequency Detectors for Carrier Recovery in QAM Systems", IEEE CH2314–3/86/0000–0482, pp. 482–486, 1986.

Brown, R., Sorbaba, M., Wang, T., Segev, R., Van Kerkhove, J.F., Mildonian, H., Hall, C., Zimmerman, G., Martinez, K., Pires, T.K., Mullaney, K., Zain, I., Young, B., Gleichauf, P., Hohhof, K., "Draft Interface Specification for a CAP Based RADSL System", Jul. 22, 1996.

Karam, G., and Sari, H., "A Data Predistortion Technique with Memory for QAM Radio Systems", IEEE Trans. on Communications, vol. 39, No. 2, pp. 336–344, Feb. 1991.

*Primary Examiner*—Don N. Vo
*Attorney, Agent, or Firm*—Leonard Charles Suchyta

[57] ABSTRACT

An improved digital bidirectional communications transceiver in which the upstream and downstream portions of the frequency spectrum are allocated in response to transmission line conditions and impairments such as background noise, radio frequency interference (RFI), crosstalk and reflected signals. The movement of the upstream and downstream carrier frequencies are elastic in that they may be adjusted in near real-time involving methods for determining the signal quality parameter(SQP) of the received signal. The SQP is used to estimate the bit error rate (BER) margin on the received data and also takes into account the total signal to interference ratio (SIR), where the interference includes crosstalk, RFI, and residual echo from the neighboring upstream or downstream channel. Because the carrier frequencies of the upstream and downstream channels are being dynamically allocated, it is necessary to implement a robust carrier acquisition, recovery and lock algorithm. The robust carrier algorithms allow carrier recovery of the transmitted upstream and downstream signals independent of the particular modulation or symbol rate.

2 Claims, 9 Drawing Sheets

U.S. PATENT DOCUMENTS

| | | | |
|---|---|---|---|
| 4,555,790 | 11/1985 | Betts et al. | 375/261 |
| 4,587,498 | 5/1986 | Bonnerot et al. | 329/122 |
| 4,615,038 | 9/1986 | Lim et al. | 375/14 |
| 4,731,816 | 3/1988 | Hughes-Hartogs | 379/93.31 |
| 4,805,191 | 2/1989 | Burch et al. | 375/11 |
| 4,827,431 | 5/1989 | Goldshtein | 375/226 |
| 4,890,300 | 12/1989 | Andrews | 375/60 |
| 4,980,897 | 12/1990 | Decker et al. | 375/38 |
| 4,995,057 | 2/1991 | Chung | 375/13 |
| 5,105,445 | 4/1992 | Karam et al. | 375/60 |
| 5,107,520 | 4/1992 | Karam et al. | 375/60 |
| 5,113,414 | 5/1992 | Karam et al. | 375/60 |
| 5,148,448 | 9/1992 | Karam et al. | 375/60 |
| 5,249,200 | 9/1993 | Chen et al. | 375/58 |
| 5,295,138 | 3/1994 | Greenberg et al. | 370/344 |
| 5,313,467 | 5/1994 | Varghese et al. | 370/468 |
| 5,339,054 | 8/1994 | Taguchi | 332/100 |
| 5,394,392 | 2/1995 | Scott | 370/295 |
| 5,479,447 | 12/1995 | Chow et al. | 375/260 |
| 5,497,505 | 3/1996 | Koohgoli et al. | 455/34.1 |
| 5,519,356 | 5/1996 | Greenberg | 329/340 |
| 5,548,809 | 8/1996 | Lemson | 455/34.1 |
| 5,572,553 | 11/1996 | Kimiavi et al. | 375/344 |
| 5,606,577 | 2/1997 | Grube et al. | 375/295 |
| 5,621,767 | 4/1997 | Brandt et al. | 375/344 |
| 5,673,290 | 9/1997 | Cioffi | 375/260 |
| 5,694,440 | 12/1997 | Kallman et al. | 375/355 |
| 5,705,958 | 1/1998 | Janer | 332/103 |
| 5,710,766 | 1/1998 | Schwendeman | 370/329 |
| 5,726,978 | 3/1998 | Frodigh et al. | 370/252 |
| 5,732,333 | 3/1998 | Cox et al. | 455/126 |
| 5,751,766 | 5/1998 | Kletsky et al. | 375/224 |

METHOD AND APPARATUS FOR VARIABLY ALLOCATING UPSTREAM AND DOWNSTREAM COMMUNICATION SPECTRA

FIELD OF THE INVENTION

The present invention generally relates to the field of digital data communications. More specifically, the present invention is for an improved transmission system which optimizes the transmitted signal characteristics for a particular CAP/QAM based transmission medium. In particular, this invention relates to a method and apparatus for variably allocating the upstream and downstream communication spectra based on the channel impairments such as co-channel interference caused by crosstalk and radio frequency interference (RFI) in a bidirectional communication system.

BACKGROUND OF THE INVENTION

Analog telephone communication or POTS (plain old telephone service) typically requires a bandwidth of approximately 4 KHz. The existing twisted pair copper wire infrastructure now in place and initially designed for analog voice communication is now being viewed by telephone companies as a means of delivering high-speed digital information, usually over the "last mile" (i.e., the last segment of copper wire between a central office and a user location). To accommodate the high speed digital data over the same copper wire as the POTS service, a pair of modems are used, one at a central location (the central office or optical network unit (ONU)) and another at the user or residential premise, called a digital-subscriber-line (DSL) modem. In the case of DSL, the digital information is communicated over the same copper wire as the POTS service, but at higher frequencies, with the lower portion of the frequency spectrum being reserved for POTS service in the event of a failure of the high speed communication system. Passive filters are used to separate the POTS service and the high speed data which occupies the frequency spectrum from approximately 30 kHz up to 10 MHz. This feature is commonly referred to as "lifeline POTS service" and is generally advantageous to maintain as part of a communication system due to the time-tested reliability of POTS service.

While there are several versions of DSL, one type is an Asymmetric DSL (ADSL) communication system which is intended for consumer applications such as Video on Demand and Internet access. ADSL provides bidirectional data communication between the central office or "CO" and several end user or remote locations. In such an asymmetric system, the "downstream" data direction is defined as the transmission of data from the central office or ONU to the remote locations, while the "upstream" data direction is defined as the transmission of data from a remote location to the central office. Because the bandwidth capacity of the copper wire is somewhat limited, the ADSL asymmetric data communication system allocates more of the available frequency spectrum to the downstream direction. This allocation is based primarily on the fact that more data generally flows in the downstream direction than in the upstream direction. For example, one application of this type of system may be "video on demand" where an end user at a remote location requests the transmission of a particular video program. In this situation, the upstream data consists primarily of control and selection information, whereas the downstream data is significantly larger in that it consists of large amounts of data intensive video information. Thus, the upstream and downstream channels need not be equal for most, if not all, applications.

The transmit signal frequency spectrum allocation for a conventional CAP (Carrierless AM/PM) based Rate Adaptive DSL (RADSL) system utilizing the existing copper wire infrastructure, which has been proposed by AT&T Paradyne to the T1.E 1.4 Committee, is shown in FIG. 1. As shown in FIG. 1, POTS communication occupies the lowest portion of the spectrum, typically 4 KHz. The next portion of the spectrum is allocated to the upstream channel. The spectral start frequency for the upstream channel is 35 kHz and the baud rate is fixed at 136 kbaud for modulations of 8, 16, 32, 64, 128 and 256 CAP. The next portion of the spectrum is allocated to the downstream channel. The spectral start frequency for the downstream channel is 240 kHz and the baud rate is selectable from 340, 680, 816, 952, and 1088 kbaud for modulations of 8, 16, 32, 64, 128 and 256 CAP. The upstream and downstream channels both use nominal square-root raised cosine shaping. The selection of baud rate and modulation format is determined during an initialization sequence where an exhaustive search is performed to locate the best configuration for the given loop and noise environment.

However, there are several drawbacks to the above mentioned implementation. First of all, it is only effective if the interference and noise environment remain fairly static, since the line conditioning is only performed during the initialization sequence. Second, a single large narrowband interference which is typical for RFI may result in a significant reduction in available modulation states required to maintain the necessary BER margin.

The present intention overcomes these drawbacks by employing a robust technique for line probing and characterization which allows a near-real time allocation of the upstream and downstream spectra, while at the same time optimizing the baud rate and modulation format.

SUMMARY OF THE INVENTION

The present invention provides an improved digital bidirectional communication transceiver system in which the upstream and downstream portions of the frequency spectrum are allocated based on the computed signal quality parameters representative of the line conditions. For example, the downstream channel may be positioned at a lower frequency immediately adjacent the POTS channel, and the upstream channel may be positioned at a frequency higher than the downstream channel. Essentially, the positions of the upstream and downstream channels are reversed as compared to the conventional CAP based Rate Adaptive DSL (RADSL) system. The reversal of the upstream and downstream channels results in improved performance because generally the upstream channel is more robust and more tolerant to noise or attenuation introduced by the communication medium.

A signal quality parameter (SQP) is estimated at each receiver for either the upstream and downstream channels, repectively. The SQP is used to estimate the bit error rate (BER) or SNR margin on the received data. The SQP takes into account the total signal to interference (SIR) ratio, where the interference includes background noise, crosstalk, residual intersymbol interference, residual echo from the neighboring upstream or downstream channel, and distortion.

Additionally, the frequency spectrum allocated to both the upstream and downstream channels is elastic in that they may be adjusted in near real-time to match the particular bandwidth requirements of a given system at a given point in time. This is accomplished by a combination of adjusting the baud rate, modulation format and spectral shaping. To minimize the noise and attenuation phenomena introduced by the communication medium, the upstream channel is always positioned immediately adjacent the downstream channel. Thus, since the width of the downstream channel is elastic, the position of the upstream channel moves accordingly. In this way, the most efficient portion, i.e., the lowest frequency portion, of the spectrum is always utilized.

Because the carrier frequencies of the upstream and downstream channels are being dynamically allocated, it is necessary to implement a robust carrier acquisition, recovery and lock algorithm. The robust carrier algorithms allow carrier recovery of the transmitted upstream and downstream signals independent of the particular modulation format or baud rate.

The present invention will become more apparent from the following Brief Description of the Drawings and Description of Preferred Embodiments.

DESCRIPTION OF PREFERRED EMBODIMENTS

Figure 4:
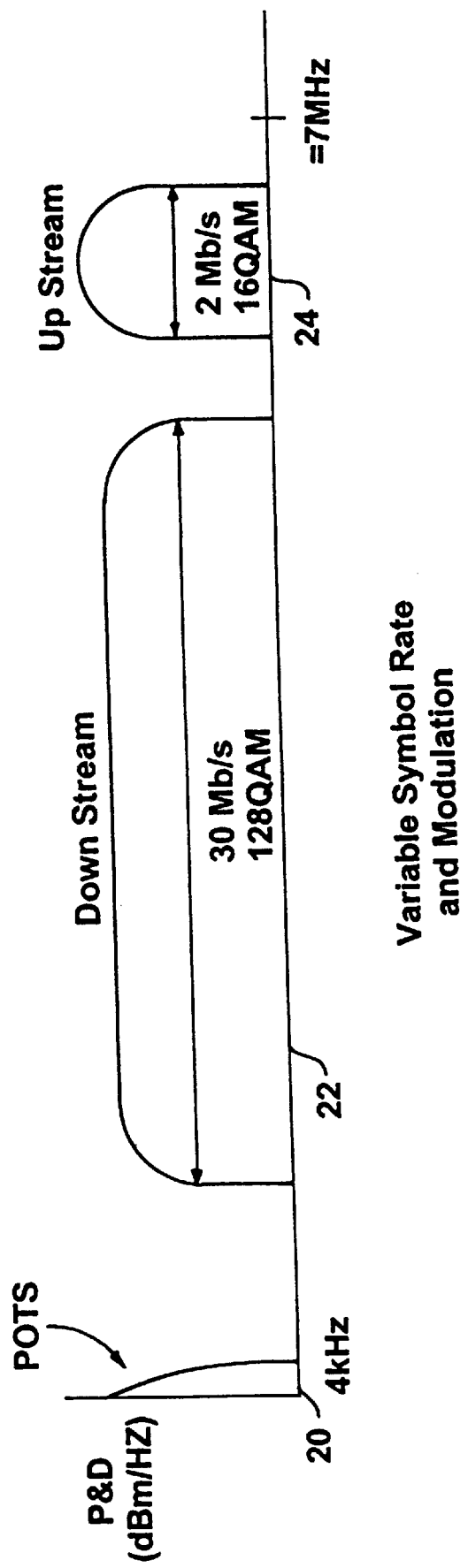
FIG. 4 is an illustration of a frequency spectrum according to the present invention showing an increase in the width of the downstream channel.

Referring to FIG. 4, therein is shown the frequency spectrum allocation according to the present invention. As shown in FIG. 4, the POTS channel 20 is positioned at the lowest portion of the frequency spectrum. Next to POTS is positioned the downstream channel 22. Finally, the upstream channel 24 is positioned adjacent the downstream channel 22 at the next usable frequency portion.

Figure 1:
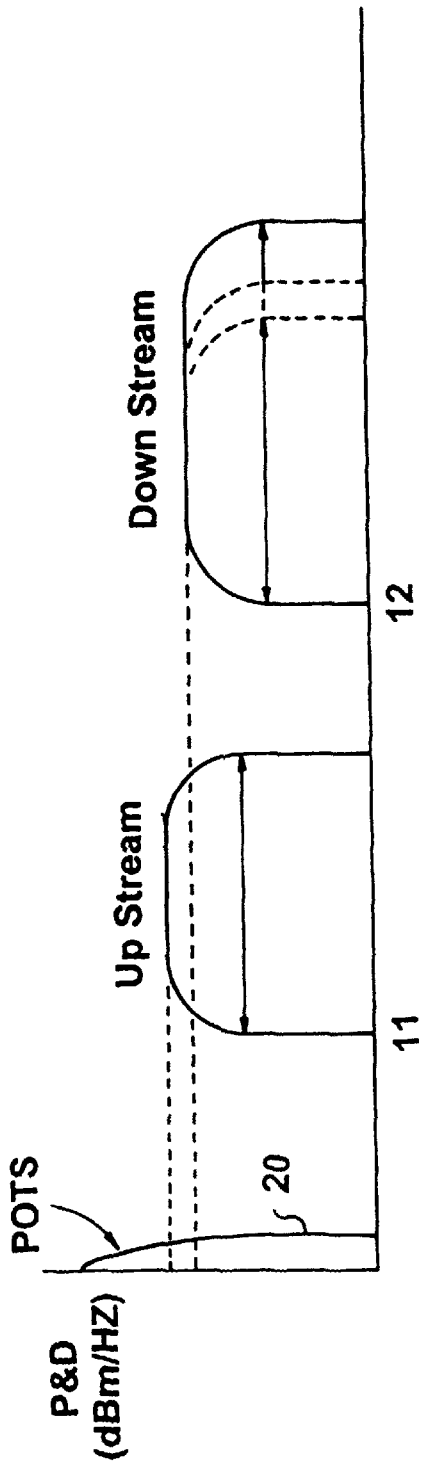
FIG. 1 is an illustration of a prior art frequency spectrum.
Figure 2:
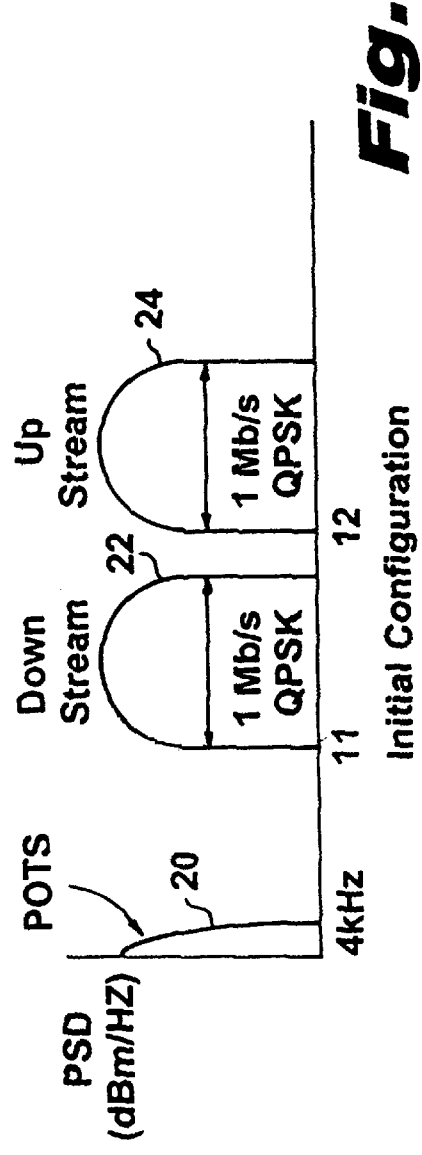
FIG. 2 is an illustration of an initial frequency spectrum according to the present invention.

Transceiver initialization is required in order to establish a bidirectional communication session between the local and remote transceivers. FIG. 2 shows the frequency spectrum of FIG. 4, upon initialization. It should be noted that intitialization may occur at installation or at any time upon user request.

Initially, the downstream channel 22 is set to a predetermined minimum bandwidth, and the upstream channel 24 is positioned immediately adjacent the downstream channel 22, but higher in frequency. With the upstream and downstream channels 24 and 22 in the positions shown in FIG. 2, the portions of the frequency spectrum occupied by the upstream and downstream channels are analyzed using a signal quality parameter (SQP) analysis, which is described in detail below. Essentially, the SQP analysis determines the signal to noise ratio of signal,, being transmitted in a particular portion of the frequency spectrum and determines the interference environment associated with that portion of the spectrum.

Figure 3A:
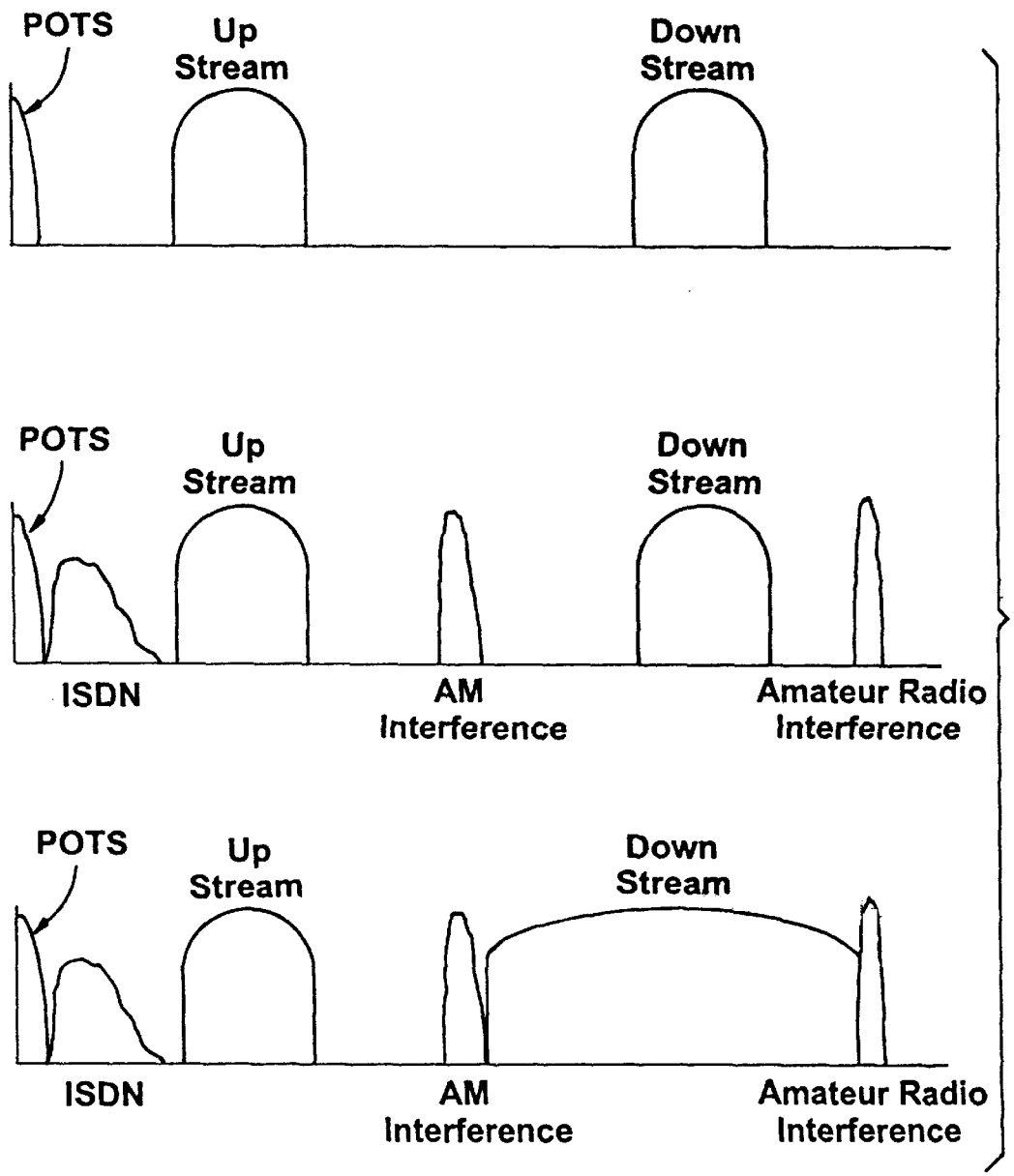
FIG. 3 is an illustration of a frequency spectrum according to the present invention showing the repositioning of the upstream channel.
Figure 3B:
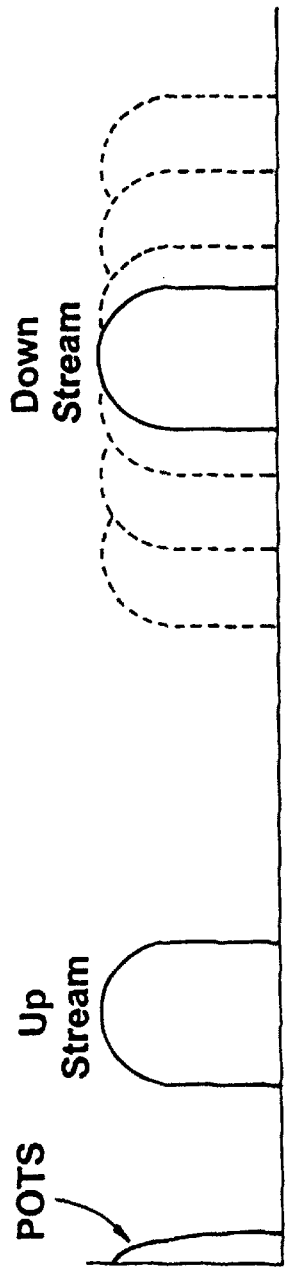
Figure 3C:
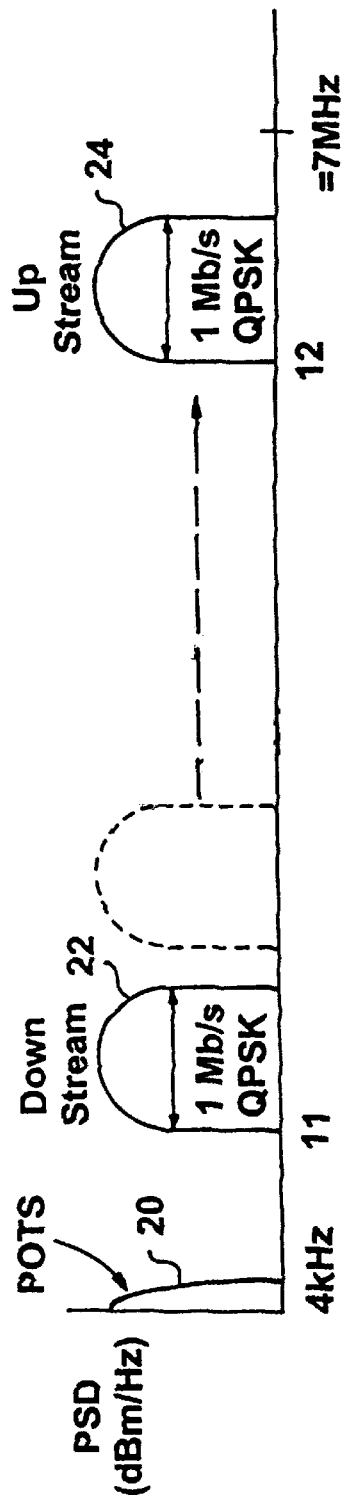

Next, as shown in FIG. 3, the upstream channel 24 is incrementally swept up in frequency and that portion of the frequency spectrum is analyzed using a combination of a complex FFT and the SPQ analysis described herein. This process is repeated until the usable portion of the frequency spectrum has been adequately characterized and identified. The usable portion of the frequency spectrum is determined by identifying the highest portion of the frequency spectrum which still provides adequate signal transmission performance. It should be noted that as the upstream channel 24 is moved up in frequency to characterize the different portions of the frequency spectrum, the first portion which results in unacceptable signal to noise performance does not necessarily determine the upper limit of the usable portion of the frequency spectrum. Rather, this may just be due to spurious noise or other narrowband radio frequency interference phenomenon (RFI), and may, in fact, be followed by further usable portions of the spectrum. Thus, it is necessary to continue the characterization of the frequency spectrum beyond the first area of poor performance. Generally, the upper limit of the usable portion of the frequency spectrum is reached once consistently poor performance is observed for several contiguous regions.

In order to maximize the available bandwidth for the downstream channel 22, the upstream channel 24 may le positioned at the last usable upper portion of the spectrum (FIG. 4). This allows the downstream channel to be increased in size to accommodate the particular data transmission requirements of a given system configuration.

The initialization or characterization process may be carried out repeatedly at certain intervals to characterize transmission media whose characteristics may change according to time, temperature, and other conditions.

Because the upstream and downstream channels 22 and 24, respectively, are moved around in frequency, it is necessary to quickly and accurately locate the carrier frequency in order to properly demodulate each of the upstream and downstream channels. This is accomplished using a carrier recovery algorithm discussed in detail below.

Signal Quality Parameter (SQP)

Figure 5:
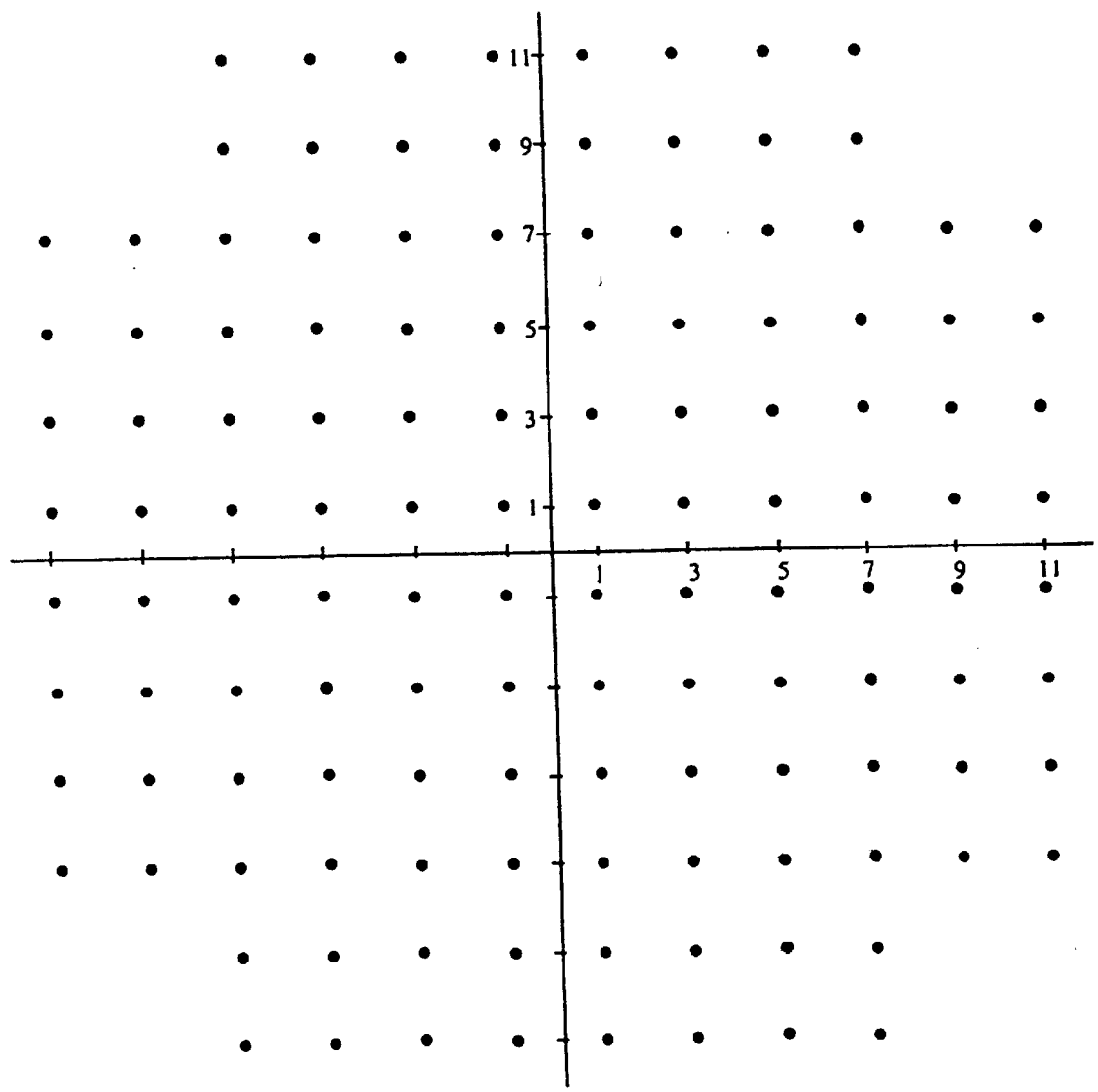
FIG. 5 is an illustration of a 128 QAM signal constellation.

The SQP analysis involves analyzing the relation and applicability of determining the signal to noise (or carrier to noise) ratio of a received signal from a calculation of the cluster variance of the signal constellation. FIG. 5 illustrates a typical signal constellation for a 128 QAM signal. Each point represents a particular phase and amplitude state. In the case of 128 QAM, each point represents seven bits of data. Cluster variance is a statistical measure of the spread of the symbol clusters in the constellation about their ideal location points. Cluster variance is calculated for either or both of the x (in phase)=and y (quadrature) coordinates of a sample set of received symbols. Cluster variance also gives the relation between the signal to noise ratio and the noise margin, which is the minimum distance from any ideal constellation point to the decision boundary for the region in which that point would be selected as the symbol that was most likely transmitted. The relation is also a function of the size (number of ideal symbol locations) in the constellation.

The signal to noise ratio is calculated for constellations of different sizes when linear distortions are present, including offsets, gain mismatch, lock angle error and quad angle error. A relationship is also developed between the bit-energy to noise-density ratio and the carrier to noise ratio for an arbitrary Nyquist shaped pulse.

For a valid determination of carrier to noise ratio from a cluster variance analysis, it is necessary to be able to resolve the individual clusters and to be able to determine the cluster variance with reasonable accuracy. A relation is obtained and tabulated for the minimum carrier to noise ratio for which this may be reliably achieved for various orders of QAM and QPR modulation, i.e., for various constellation sizes.

In a digital demodulator, decision boundaries are established specifically for the modulation type being received. These decision boundaries are based on an assumed ideal constellation, i.e., a constellation without any distortion. Based on a comparison of a received signal sample with the established decision boundaries, each sample is assigned to a bin corresponding to the decision stale or symbol cluster in which it falls.

In an X-Y coordinate system, x represents the horizontal coordinate and y represents the vertical coordinate. In the absence of constellation skew and rotation, the inphase (I) phase coordinate corresponds to the x coordinate and the quadrature (Q) phase coordinate corresponds to the y coordinate. In the presence of skew or rotation, these coordinates will deviate from the ideal condition. For each cluster, the following values are accumulated:

(1) Number of samples in cluster $(i,j)$: $K_{ij}$ (2-1a)

(2) Sum of the $x$ values in cluster $(i,j)$: $\sum_{k=1}^{K_{ij}} x_{ijk}$ (2-1b)

(3) Sum of the $y$ values in cluster $(i,j)$: $\sum_{k=1}^{K_{ij}} y_{ijk}$ (2-1c)

(4) Sum of the squares of the $x$ values in cluster $(i,j)$: $\sum_{k=1}^{K_{ij}} x_{ijk}^2$ (2-1d)

(5) Sum of the squares of the $y$ values in cluster $(i,j)$: $\sum_{k=1}^{K_{ij}} y_{ijk}^2$ (2-1e)

(6) Sum of the products of the $x$ and $y$ values in cluster $(i,j)$: $\sum_{k=1}^{K_{ij}} x_{ijk} y_{ijk}$ (2-1f)

In collecting vector (amplitude-phase) data on the state of each sample of the signal, an adequate number of samples must be obtained to insure a high level of statistical significance in the subsequent analysis of the data. It is generally recommended that at least an average of 100 samples per constellation cluster (or state) be collected. Thus, for an R-state constellation, at least 100R samples need to be collected.

Using the above defined terms, the following statistics are calculated for each cluster:

(1) Sample mean x-position of cluster (i,j):

$$\bar{x}_{ij} = \frac{1}{K_{ij}} \sum_{k=1}^{K_{ij}} x_{ijk}, \qquad (2\text{-}2)$$

(2) Sample mean y-position of cluster (i,j):

$$\bar{y}_{ij} = \frac{1}{K_{ij}} \sum_{k=1}^{K_{ij}} y_{ijk}, \qquad (2\text{-}3)$$

(3) Sample variance in x on cluster (i,j):

$$s_{xx_{ij}}^2 = \frac{1}{K_{ij}-1} \sum_{k=1}^{K_{ij}} (x_{ijk} - \bar{x}_{ij})^2 \qquad (2\text{-}4)$$

$$= \frac{1}{K_{ij}-1} \left[ \sum_{k=1}^{K_{ij}} x_{ijk}^2 - K_{ij} \bar{x}_{ij}^2 \right],$$

(4) Sample variance in y on cluster (i,j):

$$s_{yy_{ij}}^2 = \frac{1}{K_{ij}-1} \sum_{k=1}^{K_{ij}} (y_{ijk} - \bar{y}_{ij})^2 \qquad (2\text{-}5)$$

$$= \frac{1}{K_{ij}-1} \left[ \sum_{k=1}^{K_{ij}} y_{ijk}^2 - K_{ij} \bar{y}_{ij}^2 \right],$$

(5) Sample covariance of x and y for cluster (i,j):

$$s_{xy_{ij}}^2 = \frac{1}{K_{ij}-1} \sum_{k=1}^{K_{ij}} (x_{ijk} - \bar{x}_{ij})(y_{ijk} - \bar{y}_{ij}) \qquad (2\text{-}6)$$

$$= \frac{1}{K_{ij}-1} \left[ \sum_{k=1}^{K_{ij}} x_{ijk} y_{ijk} - K_{ij} \bar{x}_{ij} \bar{y}_{ij} \right],$$

(6) Root mean square (RMS) size of cluster (i,j):

$$s_{ij} = \sqrt{\frac{s_{xx_{ij}}^2 + s_{yy_{ij}}^2}{2}}. \qquad (2\text{-}7)$$

Equations 2-4 through 2-6 use the unbiased estimators of the population variances. Additionally, letting $\tilde{x}_{ij}$ and $\tilde{y}_{ij}$ denote the "ideal" coordinates of the (i,j)-th constellation point, the x and y bias of cluster (i,j) can be expressed as:

$$b_{x_{ij}} = \bar{x}_{ij} - \tilde{x}_{ij}, \qquad (2\text{-}8a)$$

and $$b_{y_{ij}} = \bar{y}_{ij} - \tilde{y}_{ij}. \qquad (2\text{-}8b)$$

The total number of samples over all clusters can thus be expressed as:

$$N = \sum_{i=1}^{M} \sum_{j=1}^{M} K_{ij}, \qquad (2\text{-}9)$$

where M is the number of modulation levels in each coordinate. Thus, a quadrature amplitude modulated (QAM) constellation has $R=M^2$ clusters or states in the case of square constellations.

The sample variance of the cluster size in each coordinate, over all clusters is given by the following expression:

$$s_x^2 = \frac{1}{N-M^2} \sum_{i=1}^{M} \sum_{j=1}^{M} \left[ \sum_{k=1}^{K_{ij}} x_{ijk}^2 - \frac{1}{K_{ij}} \left( \sum_{k=1}^{K_{ij}} x_{ijk} \right)^2 \right], \quad (2\text{-}10a)$$

$$s_y^2 = \frac{1}{N-M^2} \sum_{i=1}^{M} \sum_{j=1}^{M} \left[ \sum_{k=1}^{K_{ij}} y_{ijk}^2 - \frac{1}{K_{ij}} \left( \sum_{k=1}^{K_{ij}} y_{ijk} \right)^2 \right]. \quad (2\text{-}10b)$$

Using equations 2-4 and 2-5 in 2-10a and 2-10b yields the x and y standard deviations on cluster size for the entire constellation. This is expressed as:

$$s_x = \sqrt{\frac{1}{N-M^2} \sum_{i=1}^{M} \sum_{j=1}^{M} (K_{ij} - 1) s_{xx_{ij}}^2}, \quad (2\text{-}11a)$$

$$s_y = \sqrt{\frac{1}{N-M^2} \sum_{i=1}^{M} \sum_{j=1}^{M} (K_{ij} - 1) s_{yy_{ij}}^2}. \quad (2\text{-}11b)$$

The weighting $(K_{ij}-1)/(N-M^2)$ on each cluster variance is needed to provide unbiased estimates, accounting for the number of samples in each cluster. $N-M^2$ is the number of degrees of freedom in the estimator. Finally, the RMS cluster size for the entire constellation is given by the following expression:

$$s = \sqrt{\frac{s_x^2 + s_y^2}{2}} \quad (2\text{-}12)$$

$$= \sqrt{\frac{1}{2(N-M^2)} \sum_{i=1}^{M} \sum_{j=1}^{M} (K_{ij} - 1) \left( s_{xx_{ij}}^2 + s_{yy_{ij}}^2 \right)},$$

where $s_{xx_{ij}}$ and $s_{yy_{ij}}$ are given by Equations (2-4) and (2-5). The cluster variance is given by the following equation as $$s = \sqrt{\frac{1}{2(N-M^2)} \sum_{i=1}^{M} \sum_{j=1}^{M} (K_{ij} - 1) \left( s_{xx_{ij}}^2 + s_{yy_{ij}}^2 \right)}, \quad (2\text{-}13)$$

where, N, the total number of samples over all clusters, is given by the following equation:

$$N = \sum_{i=1}^{M} \sum_{j=1}^{M} K_{ij}. \quad (2\text{-}14)$$

In Equations 2-13 and 2-14, M is the number of modulation levels in each coordinate of a QAM or QPR system (hence, a QAM constellation has $M^2$ clusters or states). $K_{ij}$ is the number of samples in cluster (i,j). Also, $s_{xx_{ij}}$ and $s_{yy_{ij}}$ are the sample variances in x and y, respectively, on cluster (i,j), and are given by the following equations as:

$$s_{xx_{ij}}^2 = \frac{1}{K_{ij} - 1} \left[ \sum_{k=1}^{K_{ij}} x_{ijk}^2 - K_{ij} \bar{x}_{ij}^2 \right], \quad (2\text{-}15)$$

$$s_{yy_{ij}}^2 = \frac{1}{K_{ij} - 1} \left[ \sum_{k=1}^{K_{ij}} y_{ijk}^2 - K_{ij} \bar{y}_{ij}^2 \right]. \quad (2\text{-}16)$$

For an ideal (undistorted) constellation, the carrier-to-noise ratio (CNR) is related to the cluster variance as follows:

$$C/N \approx L d^2 / 2 s^2, \quad (2\text{-}17)$$

where L is a number dependent on the modulation type and can take on the following values:

| Values of L | |
|---|---|
| Modulation | L |
| QPSK | 2 |
| 16-QAM | 10 |
| 64-QAM | 42 |
| 256-QAM | 170 |
| 9-QPR | 5.3333 |
| 25-QPR | 16 |
| 49-QPR | 32 |
| 81-QPR | 53.3333 |

In Equation 2-17, d is the noise margin, i.e., the minimum (perpendicular) distance to the decision boundary. For a square decision region, this is any boundary. For an ideal, undistorted constellation, $d = \frac{1}{2}$, so that $$C/N \approx L/8s^2. \quad (2\text{-}18)$$

When linear distortions to the constellation are present, including offsets, gain mismatch, lock angle error, and quad angle error, the carrier to noise ratio is related to the cluster variance s and the constellation model parameters that describe the distortion in accordance with the following relationship:

$$\frac{C}{N} = \frac{L B_{RMS}^2}{8 s^2} \left[ 1 + \frac{8}{L} \left( \frac{A_{RMS}}{B_{RMS}} \right)^2 \right], \quad (2\text{-}19)$$

where $$A_{RMS} = \sqrt{\frac{A_x^2 + A_y^2}{2}}, \quad (2\text{-}20)$$

$$B_{RMS} = \sqrt{\frac{B_{xx}^2 + B_{yy}^2}{2}}. \quad (2\text{-}21)$$

Here, $A_x$ and $A_y$ are the constellation offsets in the x and y directions, while $B_{xx}$ and $B_{yy}$ are the linear gains, or column and row spacings.

In the most general case, with arbitrary linear or nonlinear distortions of the constellation, the carrier-to-noise ratio is related to the cluster variance as follows:

$$\frac{C}{N} = \frac{\mathcal{A}_{RMS}^2}{2 s^2}, \quad (2\text{-}22)$$

where $$\mathcal{A}_{RMS}^2 = \frac{1}{M^2} \sum_{i=1}^{M} \sum_{j=1}^{M} (\hat{x}_{ij}^2 + \hat{y}_{ij}^2) \quad (2\text{-}23)$$

is the mean square signal power, expressed in terms of the estimated cluster centers, and, given by the nonlinear constellation model.

It is well known that the bit-energy to noise-density ratio, $E_b/N_o$, is related to the carrier-to-noise ratio, CNR, by:

$$\frac{E_b}{N_o} = \frac{C}{N} \times \frac{B_N}{R_b}, \quad (2\text{-}24)$$

where $B_N$ is the noise bandwidth (normally the IF bandwidth), and $R_B$ is the bit rate.

For a baseband bandwidth of W, the Nyquist rate for a rectangular pulse amplitude modulated (PAM) signal is $$R_B = 2W \log_2 M, \quad (2\text{-}25)$$

where there are $m = \log_2 M$ transmitted bits per symbol. The IF bandwidth corresponding to W is $B_N = 2W$. Therefore, for a rectangular PAM signal, the following relationship is obtained:

$$\frac{R_B}{B_N} = \log_2 M \text{ bps/Hz}. \quad (2\text{-}26)$$

For quadrature-type transmission utilizing M levels in each coordinate, there are $$m = \log_2 M^2 = 2 \log_2 M \quad (2\text{-}27)$$

bits per symbol, so that $$\frac{R_B}{B_N} = 2 \log_2 M. \quad (2\text{-}28)$$

With Nyquist pulse shaping having an excess bandwidth $\beta$, the baseband bandwidth for a quadrature modulated signal is $$W = f_N(1+\beta) = \left[\frac{R_B}{2\log_2 M^2}\right](1+\beta), \quad (2\text{-}29)$$

where fN is the Nyquist frequency. Therefore, $$\frac{R_B}{2W} = \frac{R_B}{B_N} = \frac{\log_2 M^2}{1+\beta} = \frac{2\log_2 M}{1+\beta} \quad (2\text{-}30)$$

bps/Hz, or $$\frac{B_N}{R_B} = \frac{1+\beta}{2\log_2 M}. \quad (2\text{-}31)$$

Consequently, the bit-energy to noise-density ratio for a QAM or QPR signal with M levels in each coordinate and arbitrary Nyquist pulse shaping is $$\frac{E_b}{N_o} = \frac{C}{N}\left(\frac{1+\beta}{2\log_2 M}\right). \quad (2\text{-}32)$$

Having determined the carrier-to-noise ratio from the cluster variance, this expression may then be used to determine the bit-energy to noise-density ratio.

For the cluster variance analysis to validly determine carrier-to-noise ratio, it is necessary first to be able to resolve the individual clusters, and second, to be able to determine the cluster variance with reasonable accuracy. It is not possible to resolve the individual clusters when the cluster variance is greater than or equal to the noise margin, $s \geq d$, or in the more general case with constellation distortions, $s \geq d_{rms}$. In practice, it is probably not possible to resolve the individual clusters when $s \geq kd$, where k is some number in the range $0.5 < k < 1.0$.

When $s = kd$, we have that $$C/N \approx Ld^2/2(kd)^2 = L/2k^2, \quad (2\text{-}33)$$

which in decibels may be expressed as:

$$(C/N)_{dB} = 10 \log_{10}(L/2k^2). \quad (2\text{-}34)$$

The expression in Equation 2-3.4 is then used to analyze particular portions of the frequency spectrum, i.e., to determine the interference and noise environment associated with each particular portion of the spectrum.

Limiting CNRs may be calculated as a function of k and the modulation type, as listed in the table below. It should be noted that as the assumed limiting value of k decreases, the maximum size of the cluster beyond which it is not possible to meaningfully determine a cluster variance decreases, and the minimum CNR beyond which it is not possible to meaningfully determine a cluster variance increases. If the cluster variance is smaller than kd, then the CNR will be determinable and will be greater than the limiting value. Thus, the larger k is, the better. It should further be noted that k is not a number which is selected, but it is rather determined experimentally, or may be estimated using advanced statistical techniques.

TABLE 1

Limiting Carrier-to-Noise Ratios Below Which the Cluster Variance Analysis is Invalid

| | | CNR (dB) | | | |
|---|---|---|---|---|---|
| Modulation | L | k = 0.25 | k = 0.5 | k = 0.75 | k = 1.0 |
| QPSK | 2 | 12.0 | 6.0 | 2.5 | 0.0 |
| 16-QAM | 10 | 19.0 | 13.0 | 9.5 | 7.0 |
| 64-QAM | 42 | 25.2 | 19.2 | 15.7 | 13.2 |
| 256-QAM | 170 | 31.3 | 25.3 | 21.8 | 19.3 |
| 9-QPR | 5.3333 | 16.3 | 10.7 | 6.8 | 4.3 |
| 25-QPR | 16 | 21.0 | 15.0 | 11.5 | 9.0 |
| 49-QPR | 32 | 24.0 | 18.0 | 14.5 | 12.0 |
| 81-QPR | 53.3333 | 26.3 | 20.3 | 16.8 | 14.3 |

In the case of a normal distribution of samples in each coordinate of a square cluster, when $s = d$ ($k = 1.0$), 31.7% of the samples will fall outside the cluster decision region, and 31.7% of the samples from adjacent clusters will fall inside the decision region of concern. This in turn will cause a large error, on the order of 63%, in the estimated value of s, an error of the order of 127% in the cluster variance, and a corresponding error on the order of 3.5 dB in the calculated CNR. Similarly, when k=0.75, the error in the cluster variance will be on the order of 27%, and the error in the CNR will be on the order of 1.0 dB. When k=0.5, the error in the cluster variance will be on the order of 9%, and the error in the CNR will be on the order of 0.4 dB.

Thus, while it is possible to calculate a cluster variance for any $k \leq 1$, it is recommended that $k \leq 0.5$ ($s \leq 0.5d$) to avoid excessive errors in calculating the CNR. Also, from Table 1, it is apparent that as k decreases (tighter clusters), the calculation of cluster variance and the subsequent estimation of CNR is valid for smaller CNRs. As expected, the higher-order constellations require higher CNRs to permit calculating a valid cluster variance.

Carrier Recovery Algorithm

Carrier recovery is used to locate the carrier frequency for either the upstream or downstream channel 24 and 22, respectively. As each of these channels moves around in frequency, it is necessary to quickly and accurately locate the carrier channel in order to properly demodulate the upstream and downstream channels.

Figure 6:
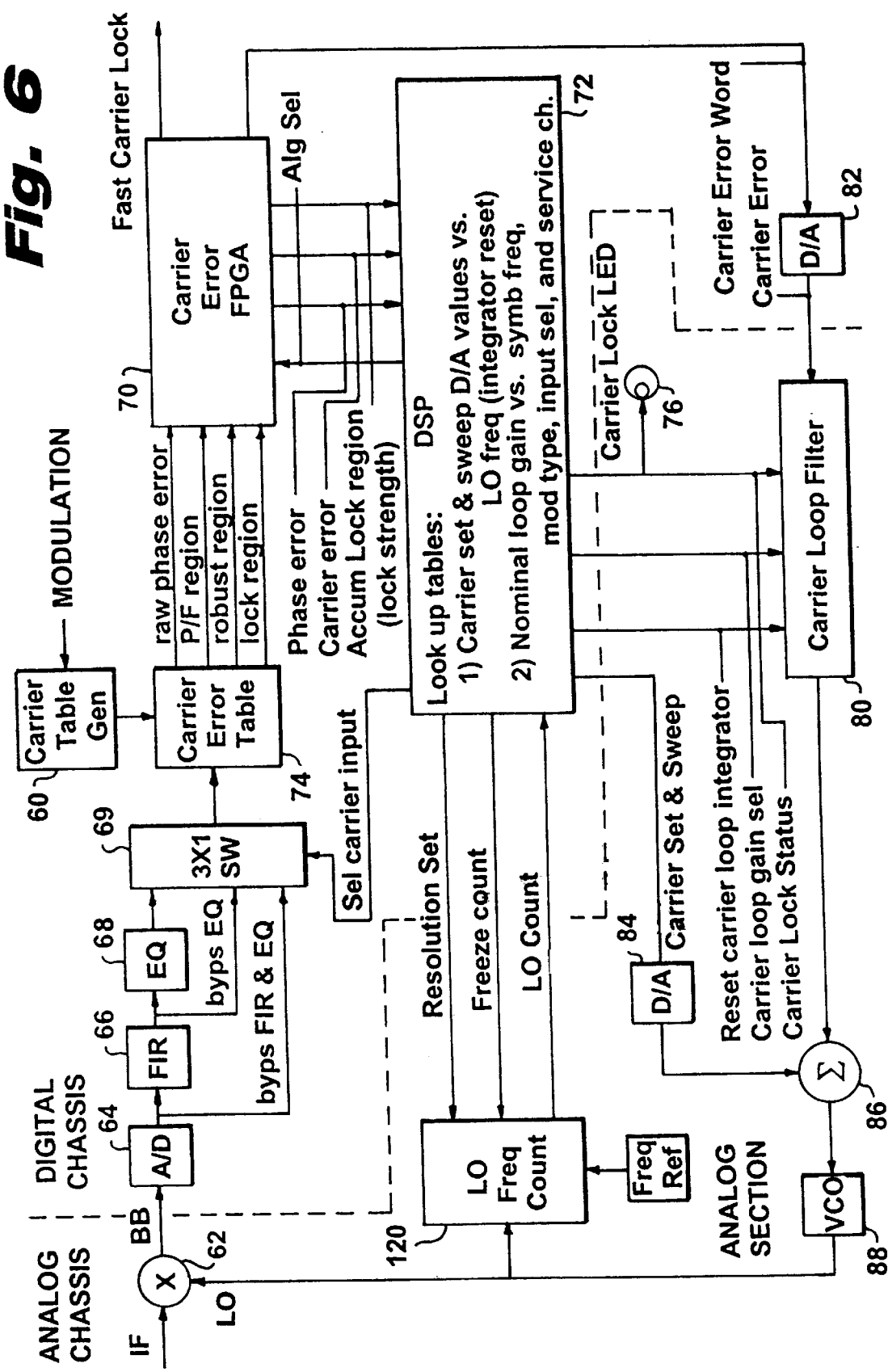
FIG. 6 is a block diagram of the carrier recovery loop circuit.

The essential elements in the carrier recovery circuit are shown in FIG. 6. The individual elements of the carrier recovery circuit will first be described. Subsequently, the interaction and operation of the individual elements will be described.

Referring now to FIG. 6, carrier table generator 60 inputs user specified parameters such as robust region distance, lock region distance, P/F region distance and automatically generates the vector information on phase error that needs to go into the carrier look up table RAM (internal to carrier table generator 60). The IF to Base Band (BB) converter 62, analog to digital converter 64, FIR filter 66, and equalizer 68 operate on both the Inphase and Quadrature (I/Q) signals. For simplification purposes, only one set of these elements is shown, e.g., the I signal. These elements are duplicated for processing the Q signal. In order to accommodate signals that have an analog service channel, the pipeline delay through the FIR 66 and/or the equalizer 68 may be bypassed, under the control of a bypass selector switch 69. Bypass selection is controlled by DSP 72. After selection by the DSP, the digitized analog signal is used as the input signal to carrier error look up table 74. The carrier error look up table 74 receives inputs from both the I and the Q signals and performs a two dimensional lookup to determine the phase error.

The phase error output of the carrier error look up table 74 is an 8 bit word in offset binary format. This phase error word is the phase error between the received signal and the ideal constellation point if the received signal is within half the distance (or some other pre specified distance) to the decision threshold for deciding the value of the received signal. Alternatively, the phase error word is the phase error between the received signal and the SATO (equalizer adaptation algorithm) point if the received signal is outside half the distance of the decision threshold. Other outputs from the look up table include the Phase/Frequency (P/F) region bit, the Robust (R) region bit, and the carrier lock region (forbidden zone) bit. These outputs are used in conventional adaptation algorithms described in "New Phase & Frequency Detectors for Carrier Recovery in PSK & QAM Systems", H. Sari & S. Morida, IEEE Transactions on Communications, Vol. 36, No. 9, September 1988; "A New Class of Frequency Detectors for Carrier Recovery in QAM Systems", H. Sari, L. Desperben, S. Morita, ICC Proceedings of the International Communications Conference 1986; "Robust Control of Decision Directed Loops", M. H. Meyers, ICC Proceedings of the International Communications Conference 1989; the contents of which are incorporated by reference herein.

These outputs are passed back into the second half of the carrier error FPGA 70.

The carrier lock region is a one bit data signal that indicates whether or not the received signal is inside or outside a square pattern. When the carrier is not properly locked, the square constellation is spinning and results in a round shape. For round (or PSK) modulations, angle sector like patterns will be used instead. The carrier error FPGA 70 accumulates this carrier lock region bit to derive a carrier lock strength word. The carrier lock strength word is then compared against a predetermined threshold (internal to the carrier error FPGA 70) which is set by the DSP 72 to indicate an initial or fast carrier lock status. This fast carrier lock status bit is used by the symbol timing recovery function. The DSP 72 can also average the lock strength word and compare it against a different threshold to produce a more reliable carrier lock status indication.

The DSP 72 will turn ON the carrier lock LED 76 only if the following conditions are met: (a) the signal is present, (b) the loop is not in frequency search mode, and (c) the lock strength indicator exceeds the predetermined threshold. This carrier lock status is also passed to the analog section of the circuit. The analog carrier loop filter 80 operates with nominal gain when the loop is in a proper lock condition. When the loop is not properly locked, the loop filter gain is increased The DSP 72 makes the determination as to whether or not a proper lock condition has been achieved.

The processing which is performed by the carrier error FPGA 70 is performed according to either the Phase/Frequency (P/F) algorithm, the Robust algorithm, or the Decision Directed (DD) algorithm, as described more fully in the Sari and Meyers references discussed above. The particular algorithm selected by DSP 72 is indicated by the alg sel control signal. The criteria for selecting a particular algorithm will be discussed in detail below. Table 2 below indicates how the carrier error FPGA 70 processes the phase error output by carrier error table 74 into the carrier error signal output by the carrier error FPGA 70. The DSP 72 may direct the carrier error FPGA 70 to use just the P/F algorithm, just the Robust algorithm, a combination of both the P/F and Robust algorithms, or neither algorithm. When neither the P/F nor the Robust algorithms is used, the algorithm used is commonly referred to as the normal Decision Directed (DD) algorithm. This type of algorithm is typically used when the error is small. However, when the error is large, the Sato error will be used instead.

TABLE 2

Carrier Error Table

| Use P/F | Use Robust | Use DD | Carrier Error |
|---|---|---|---|
| Yes - in | No | No | Previous Phase Error |
| Yes - out | No | No | Present Phase Error |
| No | Yes - in | No | Zero Phase Error |
| No | Yes - out | No | Present Phase Error |
| Yes - in | Yes - in | No | Zero Phase Error |
| Yes - in | Yes - out | No | Previous Phase Error |
| Yes - out | Yes - in | No | Not valid - use Zero Phase Error |
| Yes - out | Yes - out | No | Present Phase Error |
| No | No | Yes | Present Phase Error |

The "in" and "out" designations in Table 2 indicate whether or not the received signal is inside or outside the specified P/F or Robust region. When the received signal is inside the specified region, then the phase error is modified according to the algorithm. Normally, the P/F region will be specified as being outside the Robust region, and thus the case of the received signal being outside of the P/F region yet inside the Robust region has no meaning. The circuitry should zero out the phase error when this invalid condition occurs.

The DSP 72 reads several types of information from the carrier error FPGA 70. These include the lock strength (the accumulated lock region bit, discussed above); the phase error (the phase error output by the carrier error look up table 74); and the carrier error (the modified phase error according to the Phase/Frequency (P/F) algorithm, the Robust algorithm, or the Decision Directed (DD) algorithms discussed above.

Figure 7:
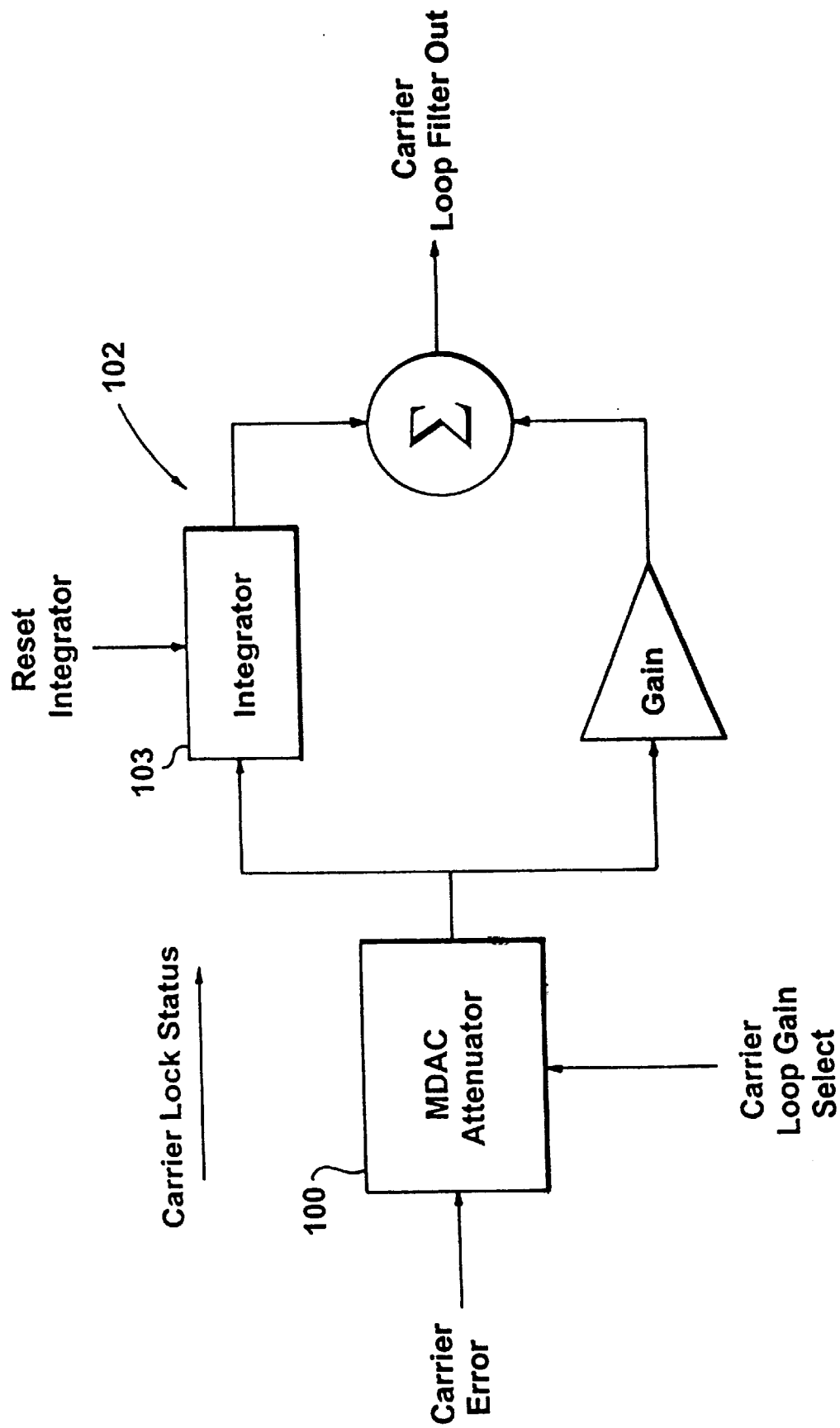
FIG. 7 is a block diagram of the carrier loop filter structure.

The carrier error output from the carrier error FPGA 70 is first passed through D/A converter 84 and then passed to the carrier loop filter 80. The structure of the loop filter 80 is shown in detail in FIG. 7. Referring now to FIG. 7, the carrier error is attenuated by a multiplying D/A (MDAC) converter 100. The attenuation of MDAC 100 is controlled by the DSP 72 by way of the carrier loop gain sel signal. The optimum carrier loop gain during tracking is a function of the symbol rate, modulation, and input bypassing. A table of optimum carrier loop gain is empirically determined for each set of operating conditions. When the carrier is not in lock, the gain should be increased to widen the carrier loop bandwidth. After passing through MDAC 100, the carrier error signal is filtered by a proportional plus integral loop filter 102. The loop filter together with the VCO 88 results in the carrier loop being a second order control loop. When the loop filter integrator 102 is reset, then the carrier loop effectively becomes only a first order loop.

The output from the loop filter 102 is summed together with the output of the LO frequency setting D/A converter 84 using summer 86. The purpose of D/A converter 84 is to both set the nominal operating frequency of VCO 88 and to sweep the operating frequency of VCO 86 during a frequency search. The frequency setting and sweeping performed by D/A converter 84 is under the control of DSP 72 (with the help of a look up table). The look up table used by the DSP 72 to implement this function contains the transfer function of the VCO as a function of the D/A setting and the output frequency when the loop integrator is reset. The contents of this look up table are generally determined empirically.

The output of summer 86 is provided as an input to VCO 88. In one preferred embodiment of the present invention, the LO frequency is chosen to be 70 MHz. However, by changing the parameters of VCO 88, the LO frequency may be set at 140 MHz or 160 MHz with minimum additional change. The LO frequency generated by VCO 88 is used by the mixer 62 to convert the intermediate frequency (IF) signal down to baseband (BB).

Figure 8:
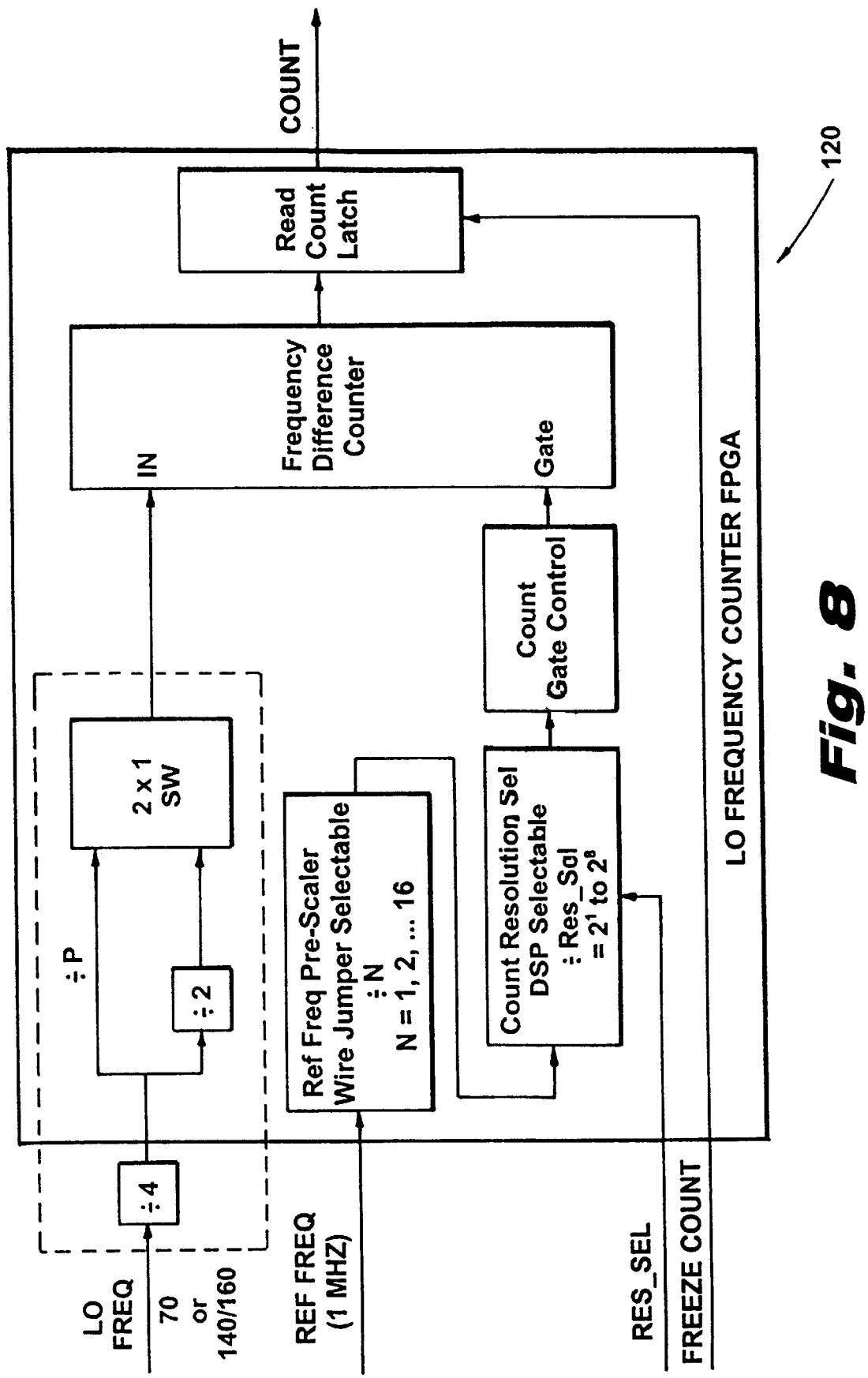
FIG. 8 is a block diagram of the LO frequency counter.

A LO frequency counter 120 is used to facilitate the carrier acquisition and re-acquisition process. A block diagram of this counter is shown in FIG. 8. The counter 120 is actually a frequency difference counter which counts the frequency difference between a reference oscillator frequency (REF FREQ) and the LO frequency generated by the VCO 88. The counting of the LO frequency is a function of the pre-scaling used on both the LO frequency and the reference frequency. A 16 bit counter is implemented, which is forced to be zero in the event of an overflow. The LO frequency may be calculated by the DSP using the following formula:

LO freq=3*D*((count+*D*)P*Ref)/(*N*\*res_sel)

count=read count value

*D*=3 if 70, 2 if 140/160

*P*=4 if 70, 8 if 140/160

Ref=actual reference frequency (1 MHz)

*N*=ref freq divide value from 1 to 16

Pre-Scaler=resolution select. 8 selection from 2^1 to 2^8

The frequency reference is pre-scaled to provide an acceptable tradeoff between count time and count resolution. The DSP can choose to read the LO frequency using a faster update during the frequency search and then switch to a higher resolution after the carrier is locked. An example of the resolution and count time for 70 MHz is shown below in Table 3.

TABLE 3

Example of Resolution and Count Time for 70 Mhz Carrier

| Pre-Scalar | Measurement Time (micro sec) | Resolution (Hz) |
|---|---|---|
| 2 | 28.00 | 142,857 |
| 4 | 56.00 | 71,429 |
| 8 | 112.00 | 35,714 |
| 16 | 224.00 | 17,857 |
| 32 | 448.00 | 8,929 |
| 64 | 896.00 | 4,464 |
| 128 | 1792.00 | 2,232 |
| 256 | 3584.00 | 1,116 |

The carrier loop is specified to acquire the carrier over a +/−200 KHz range. Table 4 shows the condition of the LO frequency count, carrier lock status and the corresponding DSP course of action. When the LO frequency count is in the range of 70 MHz +/−200 KHz, then the LO frequency count is said to be within range. If the LO frequency is outside of this range and yet the carrier is in lock, then it is possible that the carrier loop has false locked. If the LO frequency count is outside the +/−200 KHz range, and the loop is not in lock, then the VCO integrator is assumed to have saturated, i.e., it as at either the positive or negative supply voltage rail. When this condition occurs, the DSP 72 needs to issue a reset integrator command so that the integrator can start again.

TABLE 4

DSP Response Based on LO Frequency Count

| LO Freq Count | Carrier Lock LED | DSP Action |
|---|---|---|
| 0 | don't care | LO freq counter overflow, reduce resolution |
| within range | on | Carrier locked, set count resolution to high |
| within range | off | Acquiring carrier, set count resolution to low |
| outside range | on | Report possible false lock |
| outside range | off | VCO saturated, reset loop integrator momentarily |

The overall operation of the loop will now be described. The DSP 72 plays the central role in the carrier recovery operation. Proper operation of the carrier algorithm depends on the signal presence status. Signal presence can be detected by the DSP 72 reading the AGC control voltage from the analog section. The carrier recovery flow chart in FIG. 9 shows the different stages carrier recovery.

By definition, the carrier is in the frequency search mode upon initialization, or when it has lost carrier lock for a period of time, e.g., 10 seconds. This condition is represented by the top half of the carrier algorithm flow diagram of FIG. 9. In this mode, the DSP 72 steps the VCO 88 to help the carrier loop to search for the proper frequency over its full acquisition range (this is referred to as sweeping mode). The carrier loop is defined to have properly acquired the frequency after carrier lock is declared for the 1st time. At this point, the carrier loop stops searching for the frequency.

Figure 9:
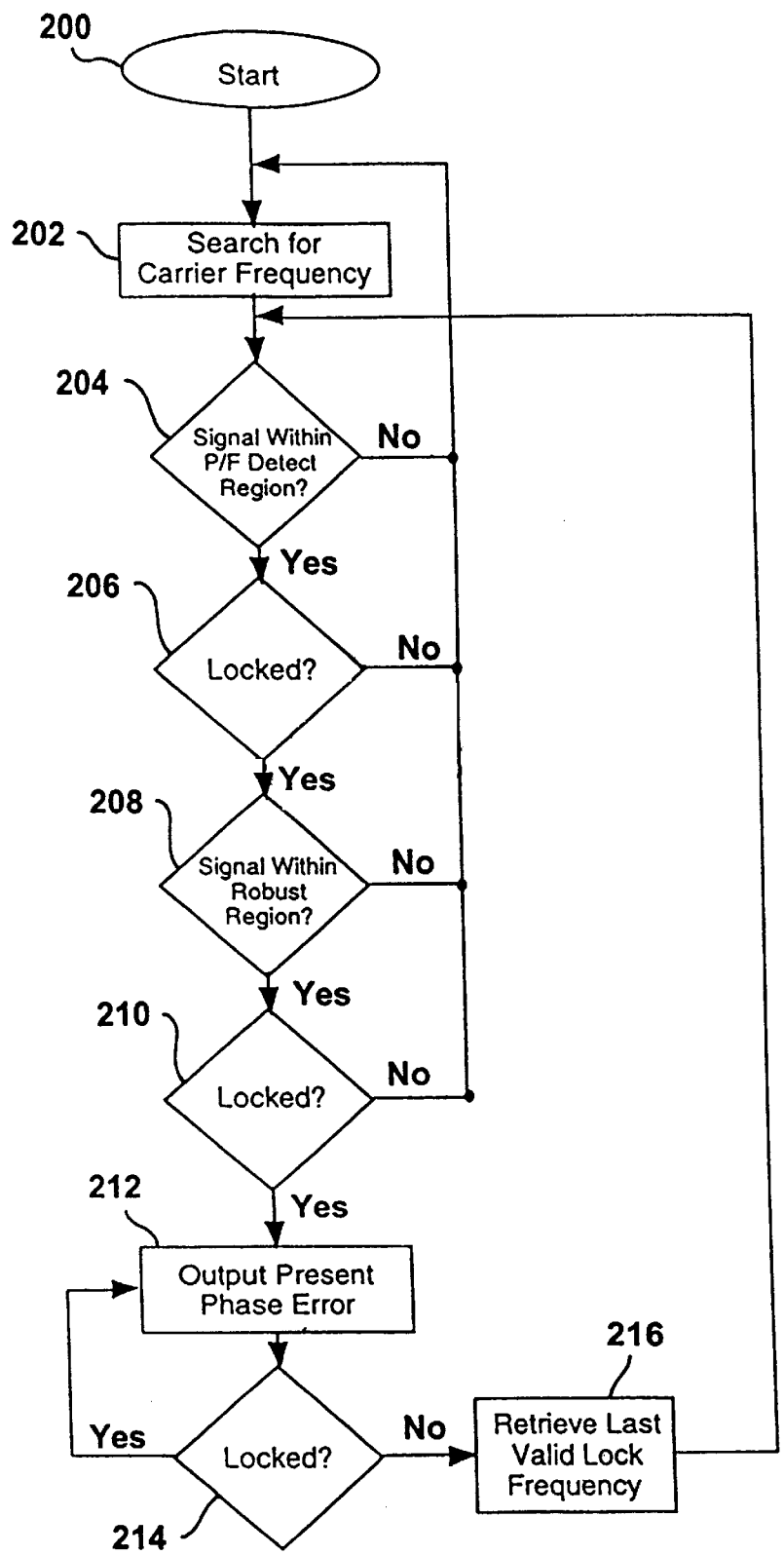
FIG. 9 is a flowchart illustrating the carrier recovery algorithm of the present invention.

The bottom half of the carrier algorithm flow diagram of FIG. 9 illustrates the operation of the carrier loop when it is improved. If the carrier lock can not be re-established for more than 10 seconds, then the carrier loop will go back to the search mode. If the signal strength falls below the threshold, then the carrier lock strength should also fall below the threshold within a short period of time. The DSP 72 should again select the Robust algorithm and perform the AFC function. If the proper signal strength is not achieved within 10 seconds, then the carrier loop will go back to the search mode. The following Table 5 represents the state of the carrier loop.

TABLE 5

| | | | | | | | | |
|---|---|---|---|---|---|---|---|---|
| | | | | Carrier Loop State | | | | |
| signal presence | Freq search | Lock Strength > Th | alg used | DSP mode | lock light | Loop Integrator | Loop Gain | comments |
| no signal | search | no | P/F | idle | off | Reset | Increase | no signal for a while or at start up |
| no signal | search | yes | P/F | idle | off | Reset | Increase | should not happen, lock threshold too low? |
| no signal | idle | no | R | AFC | off | Reset | Increase | signal lost for short time (less than 10 sec) |
| no signal | idle | yes | R | AFC | off | Reset | Increase | just lost signal, carrier lock has not drooped below threshold yet |
| present | search | no | P/F | sweep | off | Reset if VCO saturate | Increase | Searching for carrier freq |
| present | search | yes | P/F | idle | on | Integrating | Norm | Just found carrier lock |
| present | idle | no | R | idle | off | Integrating | Increase | Low SNR, hopefully transient unlock - ride it out for 10 sec before going back to search mode |
| present | idle | yes | DD | store freq | on | Integrating | Norm | tracking carrier phase, everything OK | not searching for a frequency. Whether the loop is operating in its frequency search mode or not is determined by the DSP 72.

The DSP 72 will step (sweep) the LO VCO 88 to help the carrier loop to first acquire the frequency after the signal first appears. To accomplish this, the DSP 72 first reads the LO frequency counter 120 to determine the VCO frequency. Next, the DSP 72 controls D/A 84 in the analog section to move the LO frequency. If the LO frequency from counter 120 indicates that the VCO frequency has saturated, then a carrier loop filter integrator reset pulse needs to be sent. The DSP 72 also reads the lock strength word and determines whether the carrier loop has acquired frequency lock. The carrier table generator 60 implements the Phase/Frequency (P/F) algorithm when a frequency search is in effect and the lock strength has not yet crossed the threshold. After the lock strength has passed the threshold, the DSP 72 stops searching. The lock strength and signal presence status is continuously updated. If the lock strength stays above the threshold, then the DSP 72 counts and stores the LO frequency in the high resolution mode. The LO lock frequency should be within 70 MHz +/−200 KHz range or else there is a good possibility that the carrier has false locked. The DSP 72 also signals that the carrier loop has locked by lighting the carrier lock LED 76.

If the lock strength falls below the threshold, yet the signal is still present, then the DSP 72 selects the Robust algorithm and tries to maintain the LO at the last good lock frequency (AFC) to see if the carrier lock strength can be As described in detail above, the carrier recovery algorithm operates to sweep through the frequency spectrum, searching for and then maintaining the carrier frequency for a particular communications channel, e.g., the upstream and downstream channels.

While the invention has been particularly shown and described with reference to a preferred embodiment thereof, it will be understood by those skilled in the art that various changes in form and details may lee made therein without departing from the spirit and scope of the invention.

What is claimed is:

1. A method for variably allocating upstream and downstream channels in a communication system frequency spectrum, comprising the following steps:
    allocating a first portion of the frequency spectrum for the downstream communication channel;
    allocating a second portion of the frequency spectrum for the upstream communication channel, said second portion being positioned at a higher frequency than said first portion,
    defining a usable portion of said communication system frequency spectrum, said defining step comprising the following steps:
        (a) estimating at a receiver location for a received signal at least one of signal to noise margin and bit error rate for a predetermined portion of said communication system frequency spectrum by calculating a cluster variance for a received signal constellation;
        (b) determining at least one of whether said signal to noise margin exceeds a predetermined signal to noise margin threshold and whether said bit error rate is less than a predetermined bit error rate threshold;

(c) shifting said predetermined portion to a next contiguous higher frequency portion and repeating steps (a) and (b) until the determining step indicates at least one of said signal to noise margin being less than said predetermined signal to noise margin threshold and said bit error rate exceeding said predetermined bit error rate threshold for a predetermined number of iterations;

said usable portion of said communication system frequency spectrum corresponding to the predetermined portion of said communication system frequency spectrum beyond which said determining step indicates for a predetermined number of iterations that at least one of said signal to noise margin is less than said predetermined signal to noise margin threshold and said bit error rate exceeding said predetermined bit error rate threshold.

2. The method of claim 1, wherein in Step (a) the calculating step is performed according to the following equation:

$$S = \sqrt{\frac{1}{2(N-M^2)} \sum_{i=1}^{M} \sum_{j=1}^{M} (K_{ij} - 1)\left(s_{xx_{ij}}^2 + s_{yy_{ij}}^2\right)}$$

where N=the total number of samples over all clusters, M=the number of modulation levels in each coordinate, $K_{ij}$=the total number of samples in the cluster i,j), $s_{xx}^{2_{ij}}$= sample variance in the x-direction for cluster (i,j), and $s_{yy}^{2_{ij}}$=sample variance in the y-direction for cluster (i,j).

* * * * *

UNITED STATES PATENT AND TRADEMARK OFFICE
CERTIFICATE OF CORRECTION

PATENT NO : 5,987,069
DATED : November 16, 1999
INVENTOR(S) : Neil E. Furukawa and Sheldon N. Salinger It is certified that error appears in the above-identified patent and that said Letters Patent are hereby corrected as shown below:

Title page, item [57]   ABSTRACT

In the first line, delete "bidirectional" and insert --bi-directional --
(Patent Application page 24, line 4);

Column 2, line 8, delete "T1.E 1.4" and insert -- T1.E1.4 --
(Patent Application page 2, line 19);

Column 4, line 4, delete "signal,," and insert -- signals --
(Patent Application page 5, line 3)

Column 5, line 18, delete "stale" and insert -- state --
(Patent Application page 6, line 25)

Column 9, line 23, delete "$R_B=2W \log_2 M$," and insert -- $R_B=2W\log_2 M$,--
(Patent Application page 11, line 29);

Column 9, line 25, delete "$m=\log_2 M$" and insert -- $m=\log_2 M$ --
(Amendment and Request for Reconsideration dated September 8, 1998, page 2, line 10);

UNITED STATES PATENT AND TRADEMARK OFFICE
CERTIFICATE OF CORRECTION

PATENT NO : 5,987,069
DATED : November 16, 1999
INVENTOR(S) : Neil E. Furukawa and Sheldon N. Salinger It is certified that error appears in the above-identified patent and that said Letters Patent are hereby corrected as shown below:

Column 10, line 14, delete "s $\geq$ d" and insert -- s$\geq$d --
(Patent Application page 13, line 7);

Column 10, line 16, delete "s $\geq$ $d_{rms}$." and insert -- s$\geq$$d_{rms}$. --
(Patent Application page 13, line 8);

Column 10, line 17, delete "s $\geq$ kd," and insert -- s$\geq$kd, --
(Patent Application, page 13, line 9);

Column 10, line 26, delete "2-3.4" and insert -- 2-34 --
(Patent Application page 13, line 21);

Column 11, line 6, delete "k $\leq$ 1" and insert -- k$\leq$1 --
(Patent Application page 14, line 15);

Column 11, line 6, delete "k $\leq$ 0.5" and insert -- k$\leq$0.5 --
(Patent Application page 14, line 16);

Column 11, line 6, delete "s $\leq$ 0.5d" and insert -- s$\leq$0.5d --
(Patent Application page 14, line 16);

Column 16, line 46, delete "lee" and insert -- be --
(Patent Application page 21, line 14);

UNITED STATES PATENT AND TRADEMARK OFFICE
CERTIFICATE OF CORRECTION

PATENT NO : 5,987,069
DATED : November 16, 1999
INVENTOR(S) : Neil E. Furukawa and Sheldon N. Salinger It is certified that error appears in the above-identified patent and that said Letters Patent are hereby corrected as shown below:

Column 16, line 56, delete "," and insert -- ; --
(Amendment and Request for Reconsideration dated September 8, 1998 page 3, line 1);

Column 18, line 13, delete "$K_{ij}$=the" and insert -- $K_{ij}$ = the --
(Amendment and Request for Reconsideration dated September 8, 1998 page 4, line 8);

Column 18, line 13, delete "i,j)," and insert -- (i,j), --
(Amendment dated February 8, 1999, page 2, line 8);

Column 18, line 13, delete "$s_{xx}^{2ij}$" and insert -- $s^2_{xx_{ij}}$ --
(Amendment dated February 8, 1999, page 2, line 8);

UNITED STATES PATENT AND TRADEMARK OFFICE
CERTIFICATE OF CORRECTION

PATENT NO. : 5,987,069
DATED : November 16, 1999
INVENTOR(S) : Neil E. Furukawa and Sheldon N. Salinger It is certified that error appears in the above-identified patent and that said Letters Patent is hereby corrected as shown below:

Column 18, line 15, delete "$s_{yy}^{2ij}$" and insert -- $s^2_{yyij}$ --
(Amendment dated February 8, 1999, page 2, line 9);

Signed and Sealed this

Tenth Day of April, 2001

Attest:

NICHOLAS P. GODICI

Attesting Officer     Acting Director of the United States Patent and Trademark Office